UNITED STATES PATENT OFFICE.

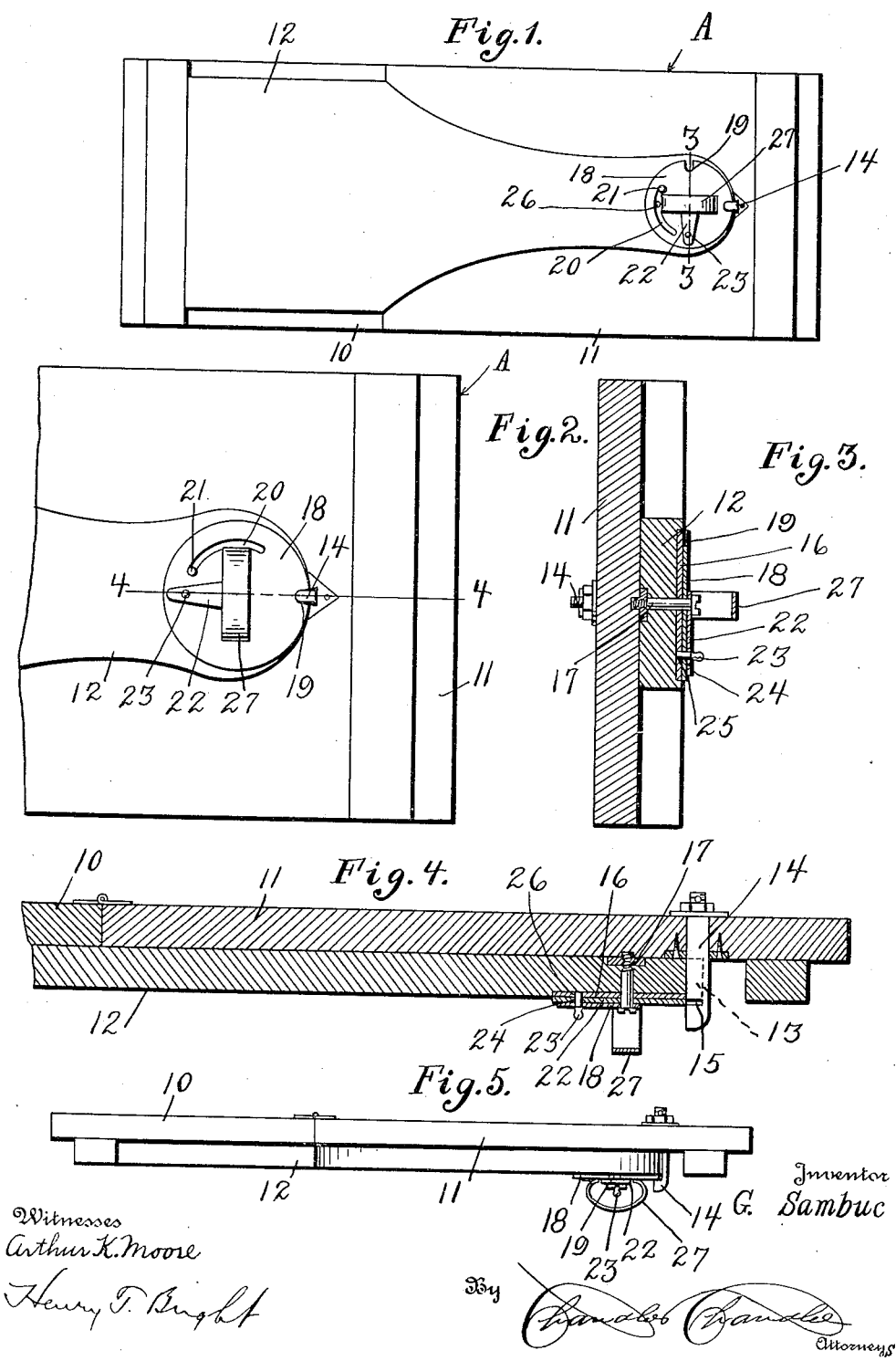

GEORGE SAMBUC, OF PLAZA, NORTH DAKOTA.

END-GATE LOCK.

1,189,295.  Specification of Letters Patent.  Patented July 4, 1916.

Application filed September 28, 1915. Serial No. 53,057.

*To all whom it may concern:*

Be it known that I, GEORGE SAMBUC, a citizen of the United States, residing at Plaza, in the county of Mountrail, State of North Dakota, have invented certain new and useful Improvements in End-Gate Locks; and I do hereby declare the following to be a full, clear, and exact description of the invention, such as will enable others skilled in the art to which it appertains to make and use the same.

This invention relates to end gate locks.

The object of the invention is to provide an end gate lock which can be easily operated and which will efficiently prevent the hinged sections of an end gate from buckling under the influence of jars and vibration.

A further object of the invention is to provide an end gate lock which will be simple in construction, efficient in use and which can be associated with end gates of ordinary construction.

With the above and other objects in view the invention consists in the details of construction and in the arrangement and combination of parts to be hereinafter more fully described and partcularly pointed out in the appended claims.

In describing the invention in detail reference will be had to the accompanying drawings wherein like characters of reference denote corresponding parts in the several views, and in which—

Figure 1 is a rear view of an end gate having the improved lock associated therewith and the latter being shown in locked position; Fig. 2, a fragment of what is shown in Fig. 1 with the lock in unlocked position; Fig. 3, a section on the line 3—3 of Fig. 1; Fig. 4, a section on the line 4—4 of Fig. 2, and Fig. 5, a plan view of a fragment of what is shown in Fig 1.

Referring to the drawings A indicates the end gate of a wagon and is shown as comprising hingedly connected sections 10 and 11. Secured to the section 10 and extending across a portion of the section 11 is the usual locking board 12 having a recess 13 in the free end thereof. Mounted on the section 11 is a stud 14 provided with a recess 15, said stud being adapted to seat in the recess 13 when the sections 10 and 11 are disposed in locked relation. Secured to the outer side of the board 12 at the free end of the latter is a bearing disk 16 suitably notched so as not to cover the adjacent end of the recess 15. Mounted in the board 12 concentric with respect to the disk 16 is a bolt 17 and rotatably mounted upon this bolt is a locking disk 18 movable in the recess 15 and provided with a notch 19 adapted in one position to aline with the recess 13. The disk 18 is provided with an arcuate slot 20 disposed concentric to the bolt 17. Carried by the disk 16 is a stud 21 which projects through the slot 20 and serves to limit the rotation of the disk 18 in either direction as will be obvious. Mounted upon the bolt 17 is a spring arm 22 carrying a locking pin 23 one end of which is constantly engaged in an opening 24 in the disk 18 and adapted to be selectively engaged in openings 25 and 26 in the disk 16 for the purpose of locking the disk 18 against rotation. Mounted on the disk 18 is a handle 27 for convenience in effecting rotation of said disk. The engagement of the pin 23 in the openings 25 and 26 is automatic and takes place immediately said pin is brought into registration with said openings.

Assuming the parts to be in the position shown in Fig. 1 it is only necessary in order to unlock the end gate to lift the pin 23 out of the opening 25 and then rotate the disk 18 to the right to its limit when the notch 19 will register with the recess 13 and permit opening of the end gate. It will be noted that when the disk 18 assumes its unlocked position the pin 23 will engage in the opening 26. To lock the end gate this operation and the parts are returned to the position shown in Fig. 1. In this position the disk 18 is engaged in the recess 15 and the end gate thus held in locked position.

What is claimed is:—

1. The combination with an end gate comprising hingedly connected sections and a locking board carried by one of the sections and overlying the other section and having a recess in its free end, of a stud carried by one of the sections and seating in the recess of the locking board when the sections are in locked relation, said stud having a recess therein, a locking disk rotatably mounted on the locking board and movable in the recess, said disk having a notch therein adapted to register with one end of the recess whereby the locking board and section may be swung away from each other, and means for automatically locking said disk against rotation when in either locking or released position.

2. The combination with an end gate comprising hingedly connected sections and a locking board carried by one of the sections and overlying the other section and having a recess in its free end of a stud carried by one of the sections and seating in the recess of the locking board when the sections are in locked relation said stud having a recess therein, a locking disk rotatably mounted on the locking board and movable in the recess, said disk having a notch therein adapted to register with one end of the recess whereby the locking board and section may be swung away from each other and a spring controlled stud automatically engageable in openings in the locking disk and the locking board to secure the locking disk against rotation.

In testimony whereof, I affix my signature, in the presence of two witnesses.

GEORGE SAMBUC.

Witnesses:
A. G. JENSTAD,
J. R. WILSON.

Copies of this patent may be obtained for five cents each, by addressing the "Commissioner of Patents, Washington, D. C."